United States Patent
Ahmed et al.

(10) Patent No.: US 12,054,119 B2
(45) Date of Patent: *Aug. 6, 2024

(54) ONE-POINT RELATIVE VOLTAGE FINGERPRINTING

(71) Applicant: Intel Corporation, Santa Clara, CA (US)

(72) Inventors: Shabbir Ahmed, Beaverton, OR (US); Marcio Juliato, Portland, OR (US); Christopher Gutierrez, Hillsboro, OR (US); Qian Wang, Portland, OR (US); Vuk Lesi, Cornelius, OR (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 1002 days.

This patent is subject to a terminal disclaimer.

(21) Appl. No.: 16/994,147

(22) Filed: Aug. 14, 2020

(65) Prior Publication Data
US 2020/0377057 A1 Dec. 3, 2020

(51) Int. Cl.
*B60R 25/30* (2013.01)
*B60R 25/104* (2013.01)
*B60R 25/24* (2013.01)
*G06F 21/44* (2013.01)
*H04L 9/40* (2022.01)

(52) U.S. Cl.
CPC ............ *B60R 25/30* (2013.01); *B60R 25/104* (2013.01); *B60R 25/24* (2013.01); *G06F 21/44* (2013.01); *H04L 63/1416* (2013.01)

(58) Field of Classification Search
USPC .......................................................... 726/23
See application file for complete search history.

(56) References Cited

U.S. PATENT DOCUMENTS

| | | | |
|---|---|---|---|
| 11,055,615 B2 * | 7/2021 | Litichever | H04L 12/40 |
| 2013/0297656 A1 * | 11/2013 | Wang | G06F 18/00 |
| | | | 707/791 |
| 2017/0318044 A1 | 11/2017 | Dagmi et al. | |
| 2018/0232740 A1 * | 8/2018 | Brown | G06F 21/32 |
| 2019/0044703 A1 * | 2/2019 | Smith | G06F 18/213 |
| 2020/0128030 A1 | 4/2020 | Ahmed et al. | |

(Continued)

FOREIGN PATENT DOCUMENTS

| | | | | |
|---|---|---|---|---|
| CA | 2878700 A1 * | 1/2014 | ............ | G06F 21/335 |
| CN | 110325929 B * | 5/2021 | ............ | G05B 19/042 |

(Continued)

OTHER PUBLICATIONS

European Search Report for the European Application No. EP21185207, mailed Dec. 21, 2021, 7 pages.

*Primary Examiner* — Sakinah White Taylor
(74) *Attorney, Agent, or Firm* — KDW Firm PLLC

(57) ABSTRACT

Systems, apparatuses, and methods to identify an electronic control unit transmitting a message on a communication bus, such as an in-vehicle network bus, are provided. ECUs transmit messages by manipulating voltage on conductive lines of the bus. Observation circuitry can observe voltage transitions associated with the transmission at a point on the in-vehicle network bus. A domain bitmap can be generated from the observed voltage transitions. ECUs can be identified and/or fingerprinted based on the domain bitmaps.

25 Claims, 11 Drawing Sheets

(56) References Cited

U.S. PATENT DOCUMENTS

2020/0128031 A1    4/2020  Juliato et al.
2021/0183002 A1*   6/2021  Sharma .................... G06T 1/20

FOREIGN PATENT DOCUMENTS

| GB | 2485241 A * | 5/2012 | ............. G06F 21/44 |
| WO | WO-2017119027 A1 * | 7/2017 | ............. B60W 50/14 |
| WO | 2018013171 A1 | 1/2018 | |
| WO | WO-2020068826 A1 * | 4/2020 | ............. G06F 21/53 |

* cited by examiner

US 12,054,119 B2

ONE-POINT RELATIVE VOLTAGE FINGERPRINTING

BACKGROUND

Modern automobiles include a number of sensors, controllers, and processors. These devices often communicate signals and/or messages via a common bus. For example, an in-vehicle network (IVN) can be used to send messages between devices in a vehicle. Identification of the device transmitting a message is important for an overall intrusion detection system (IDS). An IDS may be used to reduce risk of attacks aimed to disable, overtake, reprogram, or otherwise inhibit the safe operation of the system in which the network is deployed, such as, an automobile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
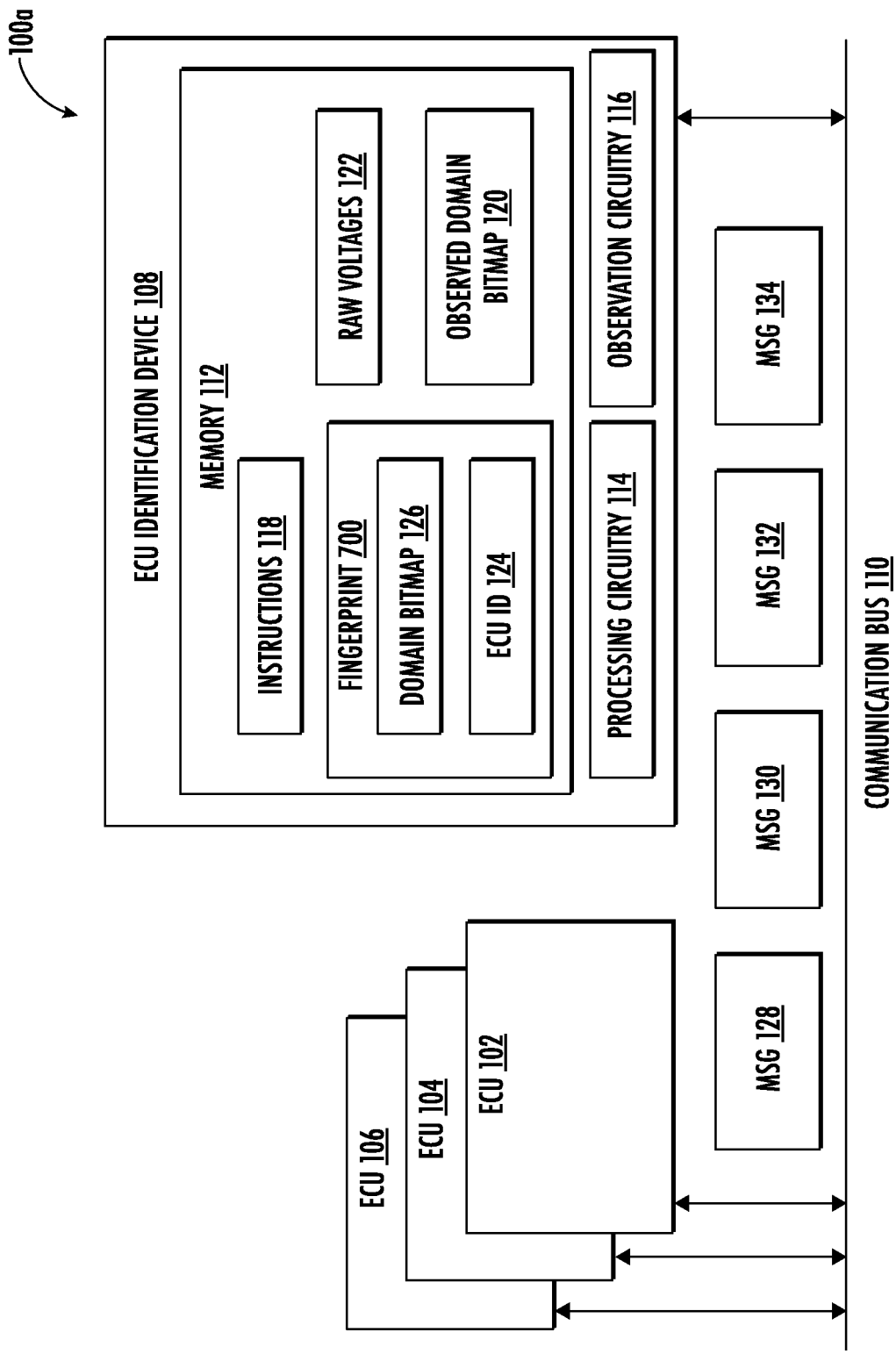
FIG. 1A illustrates a system 100a in accordance with one embodiment.

Various embodiments of the present disclosure are directed to providing an identity of transmitters of messages on a communication bus. In general, the present disclosure can be applied to a variety of communication busses, which can be implemented in many different contexts, such as, for example, industrial networks, vehicular networks, manufacturing networks, retail operation networks, warehousing networks, or the like. Although vehicular networks are often used in this description as an example implementation, the claims are not limited to networks implemented in a vehicle. However, using vehicles as an example, modern vehicles have many (often hundreds) of electronic control units (ECUs) for various subsystems. For example, there are multiple ECUs for engine control, transmission, airbags, antilock braking, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles.

These ECUs generate data and/or commands and/or consume data and/or commands. For example, a collision avoidance ECU may need to consume data from ECU speed sensors and or an ECU object sensor (e.g., radar, a camera, or the like). Accordingly, the ECUs in an automobile are often communicatively coupled via an in-vehicle network (IVN).

To that end, this disclosure provides to identify the source of messages, for example, those communicated via an IVN. Specifically, this scheme describes an approach based on observing voltage characteristics, such as, the rising, falling, and steady state transitions of the signal of the transmitting ECU. For instance, bits are communicated on the IVNs (e.g., controller area network (CAN) bus, a FlexRay bus, a CAN FD bus, an automotive ethernet bus, or a local interconnected network (LIN) bus, or the like) by voltage applied across a conductive line. In some examples, (e.g., CAN bus, or the like) multiple conductive lines are provided and a differential between the applied voltage on the conductive lines is used to convey bits.

The present disclosure provides to observe the voltage transitions (e.g., rising, falling, steady state, etc.) from a single point on a bus and to generate bitmaps for each transition. These bitmaps can be used to fingerprint ECUs. For example, bitmaps for a message can be compared to known bitmaps for an ECU, where differences between the bitmaps can indicate the message originated from a different ECU.

It is noted that this provides a more robust scheme for ECU identification than conventional methods in that the present disclosure is applicable to instances where access to multiple points on is not available. Furthermore, the fingerprinting based on techniques of the present disclosure is less susceptible to electromagnetic interference (EMI), and particularly to low frequency EMI.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1A illustrates an example system 100a, which can be implemented in a vehicle, such as, for example, an automobile, a motorcycle, an airplane, a boat, a personal watercraft, an all-terrain vehicle, or the like. System 100a includes a number of electronic control units (ECUs), for example, ECU 102, ECU 104, and ECU 106 are depicted. System 100a further includes ECU identification device 108. System 100a includes a communication bus 110, which can be a CAN bus, a FlexRay bus, a CAN FD bus, an automotive ethernet bus, or a local interconnected network (LIN) bus. Additionally, where implemented in contexts outside of the automotive space, the communication bus 110 can be a network bus adapted to the particular implementation, such as, for example, a communication network for manufacturing equipment, or the like.

In general, each of ECU 102, ECU 104, and ECU 106 include circuitry arranged to generate messages and transmit the messages onto communication bus 110 and/or consume messages from communication bus 110. The depicted ECUs (e.g., ECU 102, ECU 104, and ECU 106) can be any of a variety of devices, such as, for example, sensor devices, actuator devices, microprocessor control devices, or the like. For example, the ECUs include circuitry arranged to manipulate voltage levels on communication bus 110 (e.g., see FIG. 3) to communicate messages via the communication bus 110. As depicted, system 100a includes ECU 102, ECU 104, and ECU 106. This is done for clarity of presentation. However, in practice (e.g., in a modern automobile, or the like) hundreds of ECUs may be provided in system 100a.

As stated, ECUs are arranged to generate and/or consume messages, where the messages can include data or commands. Specifically, ECUs can convey messages via communication bus 110. As such, messages are depicted on communication bus 110. In particular, this figure depicts a number of messages (MSGs), such as, message 128, message 130, message 132, and message 134. The number of messages is depicted for purposes of clarity and ease of explanation. Many IVN standards, however, do not provide for indicating source information on the bus. Furthermore, many IVN schemes do not have sufficient bandwidth for conventional cryptography techniques useful to indicate the source of messages.

ECU identification device 108 includes memory 112, processing circuitry 114, and observation circuitry 116. Memory 112 includes instructions 118 (e.g., firmware, or the like) that can be executed by processing circuitry 114 and/or observation circuitry 116. During operation, observation circuitry 116 can observe voltage levels (e.g., raw voltages 122, or the like) on communication bus 110 at point 136 and generate observed domain bitmap 120 associated with a particular messages (e.g., one of message 128, message 130, message 132, or message 134). Said differently, for each one of the messages conveyed on communication bus 110, observation circuitry 116 can observe voltage on the bus at point 136 and can generate a bitmap for a domain (e.g., rising edge, falling edge, steady state, or the like) from the observed voltages.

In particular, observation circuitry 116 can observe voltage transitions on the communication bus 110 at a single point (e.g., point 136, or the like) and generate observed domain bitmap 120 from a scatter plot of the voltage response associated with the message. Example voltage transitions can have a waveform associated with a rising edge, a falling edge, or a steady state transition. It is noted, that the term "voltage transition" is used throughout this disclosure and includes both rising and failing transitions as well as the steady state condition, which although not always considered a voltage "transition" is included in the term voltage transition and used to fingerprint ECUs as described herein.

Processing circuitry 114, in executing instructions 118 can compare the observed domain bitmap 120 to domain bitmap 126 from a fingerprint 700 to determine an identity of an ECU sending the message (e.g., message 128 message 130, message 132, or message 134). With some examples, processing circuitry 114, in executing instructions 118 can determine the identity based on ECU ID 124 associated with the domain bitmap 126 from fingerprint 700. In some examples, processing circuitry 114, in executing instructions 118 can compare the observed domain bitmap 120 to a domain bitmap 126 from a fingerprint 700 to determine an authenticity of an ECU sending the message associated with the observed domain bitmap 120 (e.g., based on ECU ID 124, or the like). In some examples, observed domain bitmap 120 can be compared to domain bitmap 126 from fingerprint 700 using machine learning, image recognition, or other signal processing algorithms. As a specific example, processing circuitry 114 in executing instructions 118 can compare observed domain bitmap 120 to domain bitmap 126 using a machine learning model (e.g., a neural network, or the like) trained to classify bitmaps.

Processing circuitry 114, in executing instructions 118 can be arranged to generate fingerprints, e.g., fingerprint 700. For example, processing circuitry 114 can execute instructions 118 to initialize generating a number of fingerprints (e.g., fingerprint 700, etc.) and can cycle through each ECU to observe domain bitmaps associated with each ECU and insert the observed domain bitmap along with an ECU identifier into the fingerprint. In some examples, processing circuitry 114 in executing instructions 118 can train a machine learning model to recognize domain bitmaps (e.g., domain bitmap 126, or the like) from observed domain bitmaps (e.g., observed domain bitmap 120, or the like).

Processing circuitry 114 can include any of a variety of processors, such as, for example, commercial central processing units, application specific integrated circuits, or the like. Processing circuitry 114 can be a microprocessor or a commercial processor and can include one or multiple processing core(s) and can also include cache.

Observation circuitry 116 can include circuitry such as, analog to digital converters, voltage measurement circuitry, voltage waveform observation circuitry (e.g., oscilloscope circuitry, or the like) arranged to observe voltage transitions.

Memory 112 can be based on any of a wide variety of information storage technologies. For example, memory 112 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 112 can include storage devices.

Figure 1B:
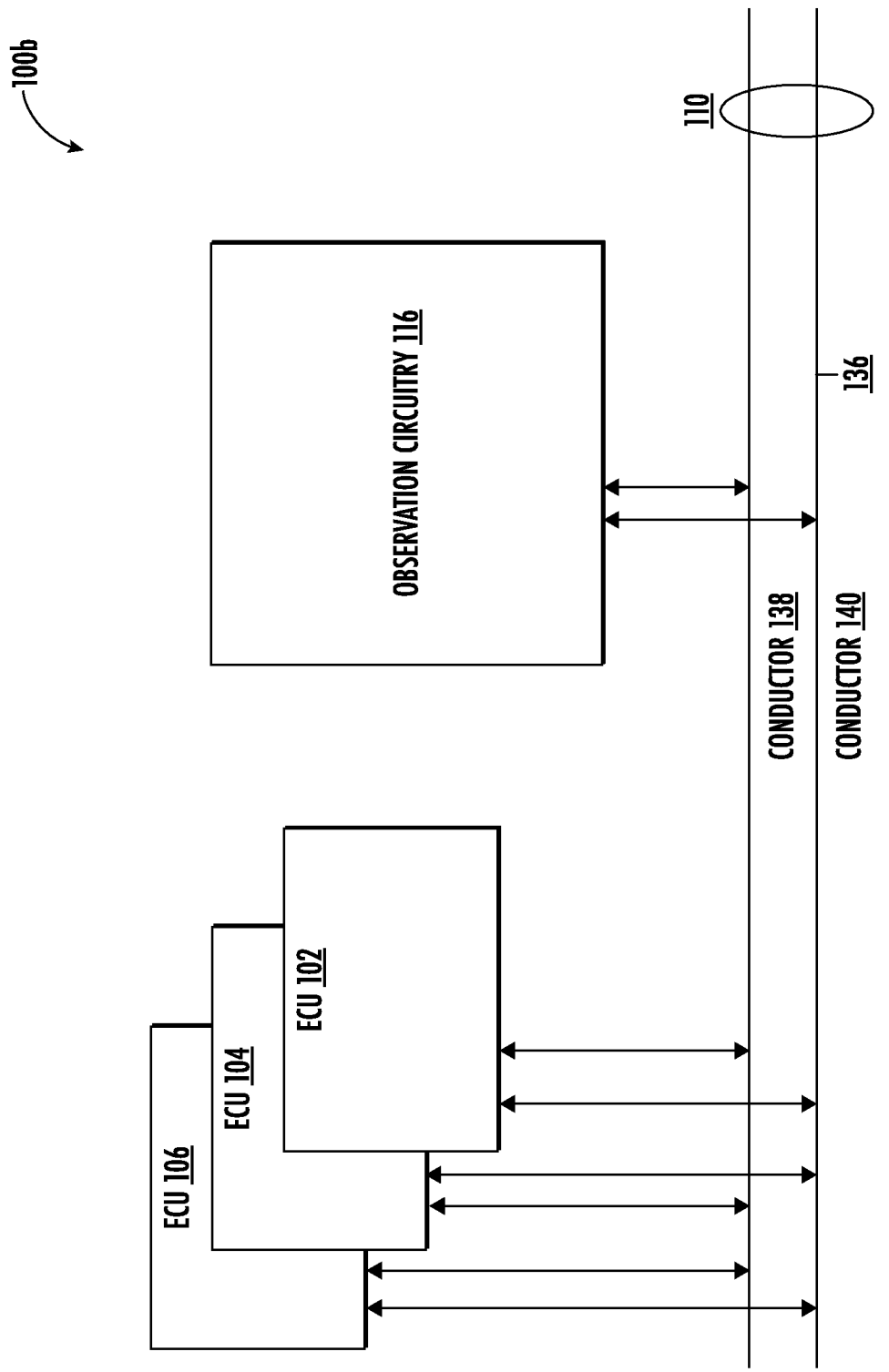
FIG. 1B illustrates the system 100b in accordance with one embodiment.

FIG. 1B illustrates system 100b, which can be system 100a of FIG. 1A in alternate detail. As depicted, system 100b includes ECU 102, ECU 104, ECU 106 and observation circuitry 116. Further, as described above, in some examples, communication bus 110 can comprise a pair of conductors, such as conductor 138 and conductor 140. During operation, ECUs (e.g., ECU 102, ECU 104, ECU 106, or the like) can communicate signals via conductor 138 and conductor 140 and observation circuitry 116 can observe voltage transitions from conductor 138 and conductor 140 at point 136. As will be described in greater detail below, bitmaps for the voltage transitions in a number of domains (e.g., rising edge, falling edge, steady state, or the like) can be generated. In general, the bitmaps represent a non-linear relationship between voltage transitions on a pair of conductors (e.g., conductor 138 and conductor 140) at point 136 on communication bus 110.

Figure 2:
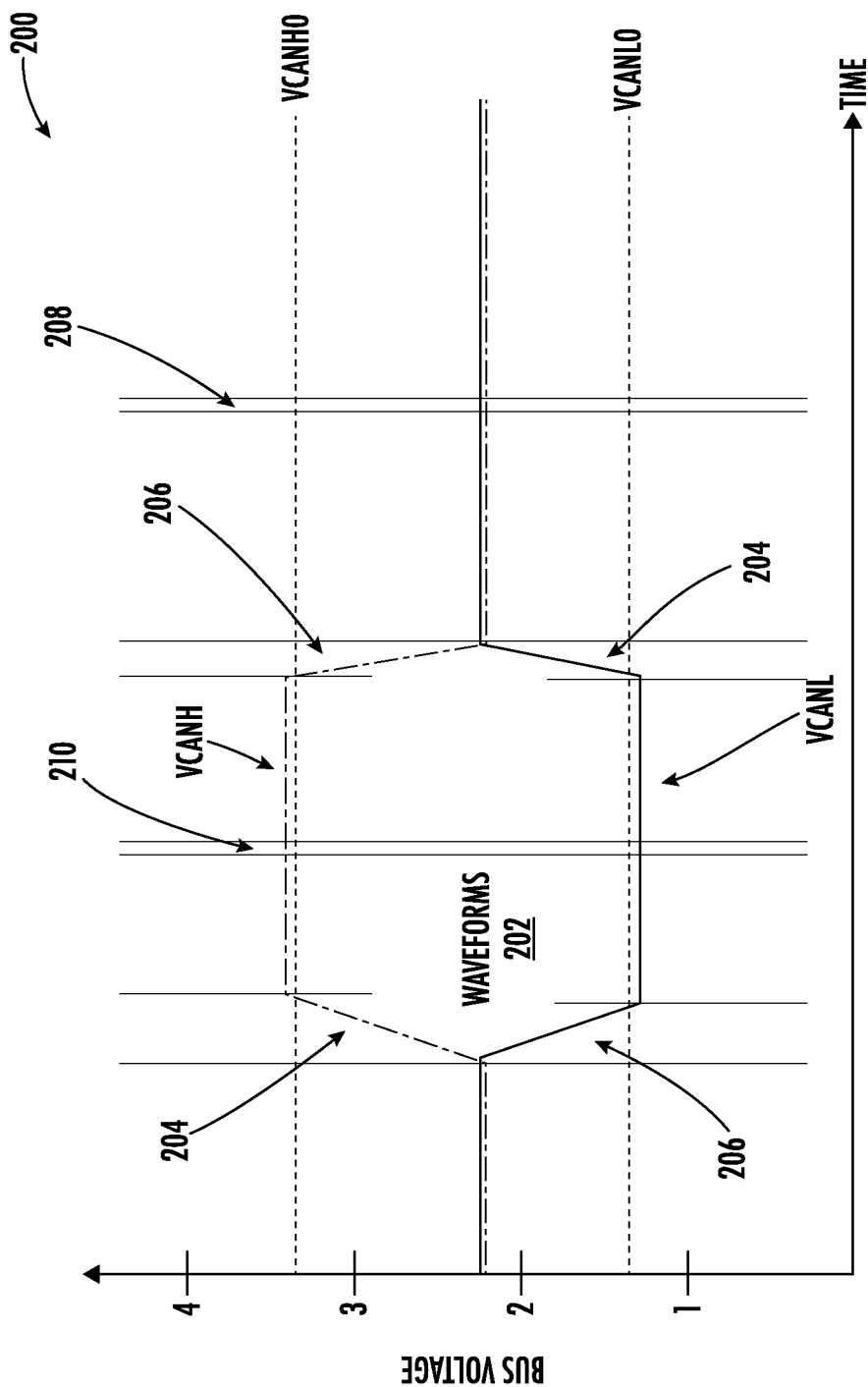
FIG. 2 illustrates a graph 200 in accordance with one embodiment.

Accordingly, FIG. 2 illustrates graph 200, showing example waveforms 202 undergoing voltage transitions. Furthermore, as the present disclosure can be implemented for IVNs (e.g., the CAN bus, or the like) the waveforms 202 are described with reference to the CAN bus. However, examples are not limited in this regard. This figure depicts nominal recessive and dominant bus voltages for a CAN bus. The CAN bus is comprised of two conductors, as such two waveforms 202 are depicted.

When an ECU (e.g., ECU 102, ECU 104, ECU 106, or the like) sends a 0 bit, it does so by increasing a first voltage (VCANH coupled to CANH) to at least VCANH0 and decreasing a second voltage (VCANL coupled to CANL) to at least VCANL0. For example, VCANH0 may be about 3.5 volts (V), while the VCANL0 may be about 1.5V. It is noted, that the term "about" may mean within a threshold value (e.g., 1%, or the like) and can be dependent upon the bus standard, which may dictate the tolerance. In the recessive state, either the CAN bus (e.g., communication bus 110) is idle or an ECU is transmitting a logic 1. In the dominant state, at least one ECU is transmitting a logic 0. Thus, each waveform on the CAN bus can go through a number of voltage transitions.

These voltage transitions are measured as a voltage over time and correspond to a portion of the overall voltage waveform. In particular, waveforms 202 can have a rising edge transition 204 or a falling edge transition 206. Additionally, waveforms 202 can have a steady state transition 208 and a steady state transition 210. That is, waveforms 202 can have a steady state transition 210 for both the recessive state as well as a steady state transition 208 for the dominant state. To send a message (e.g., message 128, message 130, message 132, message 134, or the like) on the CAN bus, an ECU can cause a number of voltage transitions (e.g., rising edge transition 204, falling edge transition 206, steady state transition 208, and/or steady state transition 210) on the CAN bus to communicate bits indicating the contents of the message.

Figure 3:
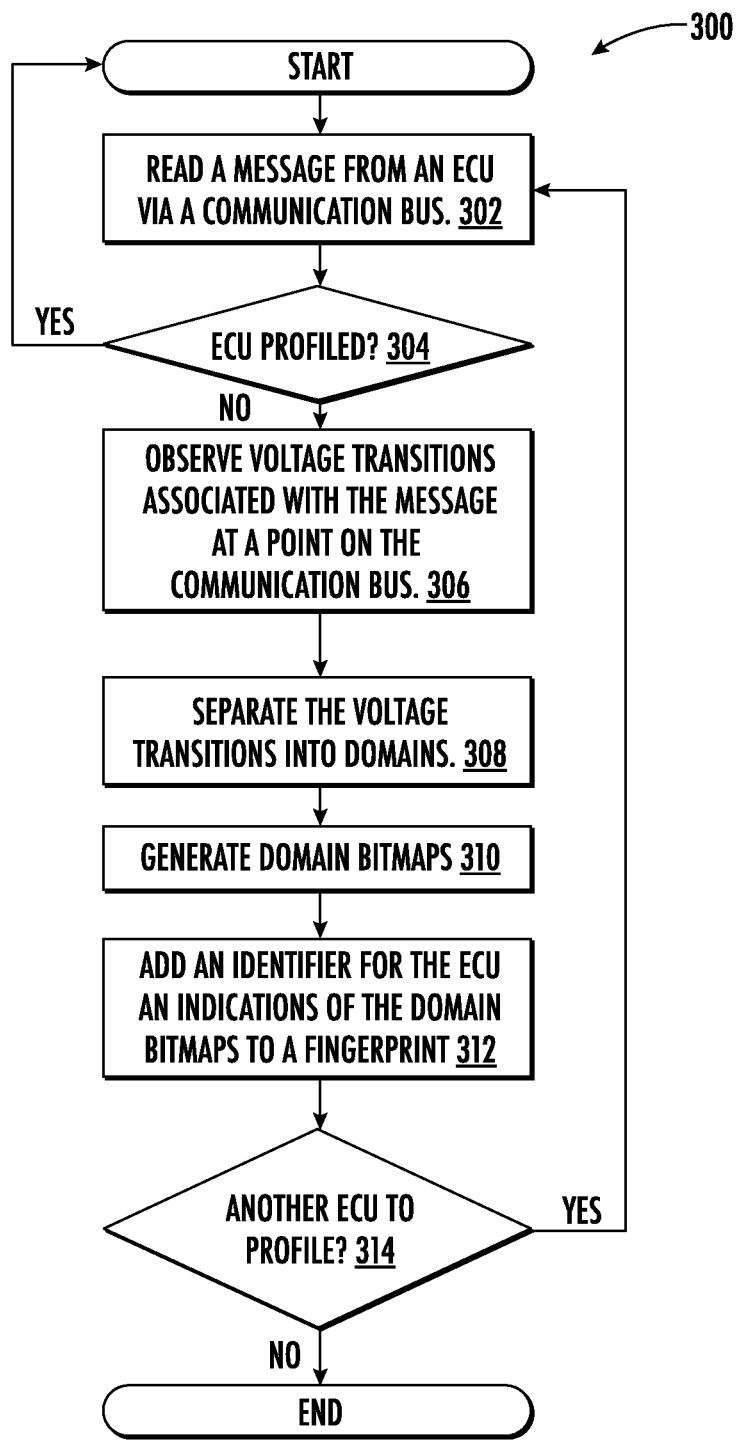
FIG. 3 illustrates a logic flow 300 in accordance with one embodiment.

FIG. 3 depicts a logic flow 300. Logic flow 300 can be implemented by an intrusion detection system (IDS), such as ECU identification device 108, to profile ECUs (or generate fingerprints for ECUs). The logic flows described herein, including logic flow 300 and other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic flow 300 may begin at block 302. At block 302 "read a message from an ECU via a communication bus" processing circuitry can receive a message from an ECU. For example, processing circuitry 114 of ECU identification device 108 can receive a message (e.g., message 128, message 130, message 132, message 134, etc.) from an ECU (e.g., ECU 102, ECU 104, ECU 106, etc.) via communication bus 110. Particularly, processing circuitry 114 in executing instructions 118 can read a message, sent by an ECU, from communication bus 110.

Continuing to decision block 304 "ECU profiled?" processing circuitry can determine whether the ECU associated with the message read at block 302 has been profiled. For example, processing circuitry 114, in executing instructions 118, can determine whether the ECU associated with the message read at block 302 has been profiled, or said differently, has been fingerprinted. From decision block 304, logic flow 300 can return to block 302 or can continue to block 306. In particular, logic flow 300 can return to block 302 based on a determination at decision block 304 that the ECU has been profiled while logic flow 300 can continue to block 306 based on a determination at decision block 304 that the ECU has not been profiled.

At block 306 "observe voltage transitions associated with the message at a point on the communication bus" processing circuitry can observe voltage transitions associated with the message at a point on the communication bus. For example, observation circuitry 116 of ECU identification device 108 can observe the communication bus 110 and particularly the voltage transitions on the communication bus 110 resulting from the ECU transmitting the message. More specifically, observation circuitry 116 can observe voltage transitions at point 136 of communication bus 110. The observed voltage transitions can be stored as raw voltages 122.

Continuing to block 308 "separate the voltage transitions into domains" processing circuitry can separate the voltage transitions into domains. More specifically, processing circuitry 114 in executing instructions 118 can separate the observed voltage transitions (e.g., raw voltages 122, or the like) into domains, such as, a rising edge domain (e.g., rising edge transition 204, or the like), a falling edge domain (e.g., falling edge transition 206, or the like) and a steady state domain (e.g., steady state transition 208 and steady state transition 210).

Continuing to block 310 "generate domain bitmaps" processing circuitry can generate bitmaps for each of the domains. More specifically, processing circuitry 114 in executing instructions 118 can generate bitmaps for each of the domains, such as, the rising edge domain, the falling edge domain, and the steady state domain. An example of this is given below.

Continuing to block 312 "add an identifier for the ECU and indications of the domain bitmaps to a fingerprint" processing circuitry can add indications of the generated domain bitmaps and an identifier for the ECU to a fingerprint. For example, processing circuitry 114 of ECU identification device 108 can add domain bitmap 126 and ECU ID 124 to fingerprint 700. Particularly, processing circuitry 114 in executing instructions 118 can add indications of domain bitmaps 126 (e.g., corresponding to domain bitmaps generated based on the voltage transitions observed when the message is read of block 302) and an ECU ID 124 (e.g., an identifier for the ECU sending the message) to the fingerprint 700. It is noted, fingerprint 700 can have a number of entries for ECU IDs 124, and thus a number of entries for domain bitmaps 126. Furthermore, for each ECU ID 124, multiple domain bitmaps 126 may be indicated (e.g., rising edge domain, falling edge domain, steady state domain(s), or the like).

Continuing to decision block 314 "another ECU to profile?" processing circuitry can determine whether to there are additional ECUs to profile. For example, processing circuitry 114 can determine whether there are more ECUs to profile. With some examples, fingerprint 700 can be pre-populated with ECU IDs 124 (e.g., by a manufacturer, by a platform installer, by a technician, or the like). Thus, processing circuitry 114 in executing instructions 118 can determine whether any ECU IDs 124 in fingerprint 700 are left to profile. From decision block 314, logic flow 300 can return to block 302 or can end. In particular, logic flow 300 can return to block 302 based on a determination at decision block 314 that there are more ECUs to profile while logic flow 300 can end based on a determination at decision block 314 that there are not any more ECUs to profile.

Figure 4:
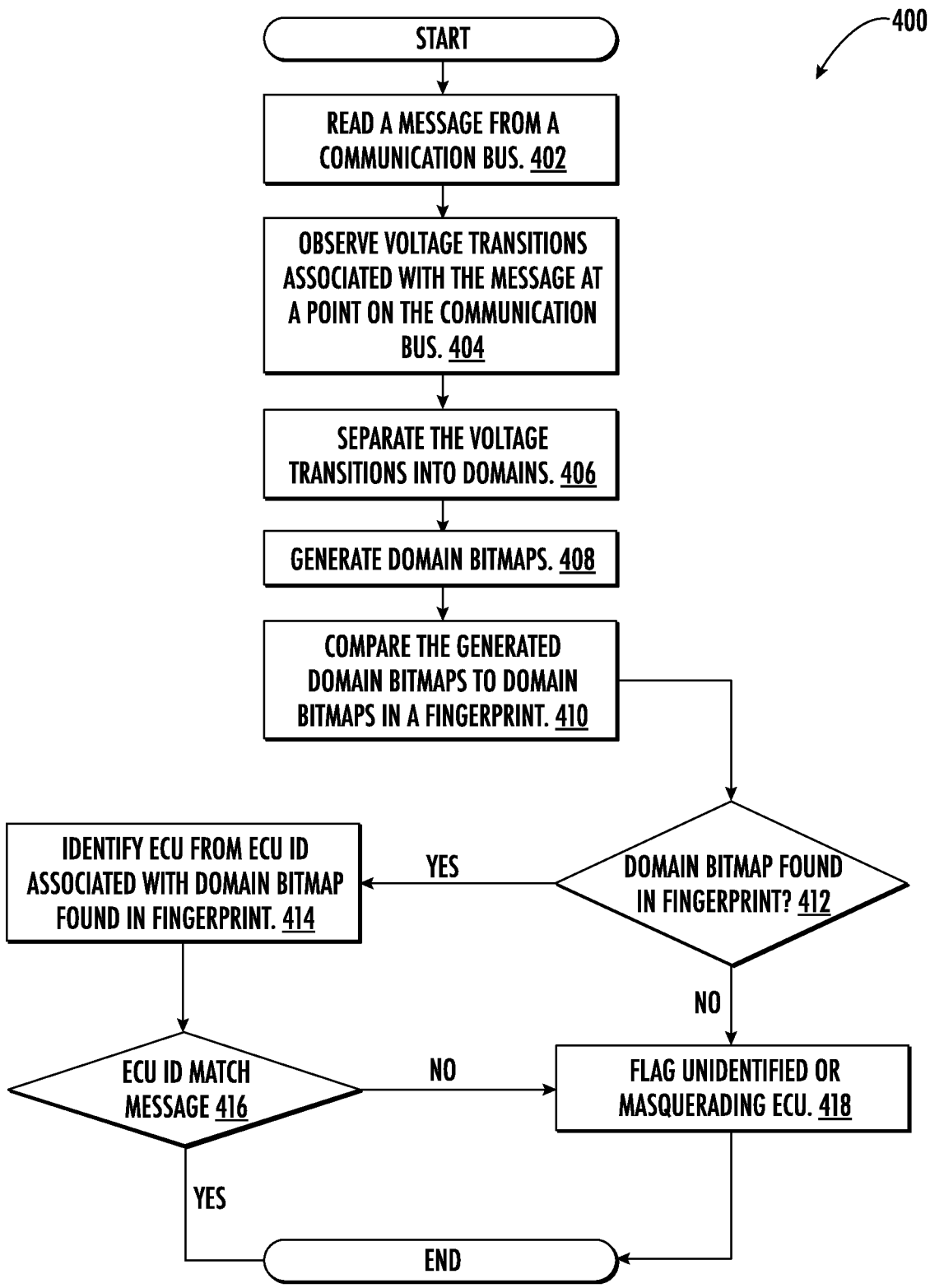
FIG. 4 illustrates a logic flow 400 in accordance with one embodiment.

FIG. 4 depicts a logic flow 400. Logic flow 400 can be implemented by an intrusion detection system (IDS), such as ECU identification device 108, to identify ECUs. Logic flow 400 may begin at block 402. At block 402 "read a message from a communication bus" processing circuitry can read a message from a communication bus. For example, processing circuitry 114 of ECU identification device 108 can read a message from communication bus. Particularly, processing circuitry 114 in executing instructions 118 can read a message (e.g., message 128, message 130, message 132, message 134, or the like) transmitted by an ECU onto communication bus 110.

Continuing to block 404 "observe voltage transitions associated with the message at a point on the communication bus" processing circuitry can observe voltage transitions associated with the message at a point on the communication bus. For example, observation circuitry 116 of ECU identification device 108 can observe the communication bus 110 and particularly the voltage transitions on the communication bus 110 resulting from the ECU transmitting the message read at block 402. More specifically, observation circuitry 116 can observe voltage transitions at point 136 of communication bus 110. The observed voltage transitions can be stored as raw voltages 122.

Continuing to block 406 "separate the voltage transitions into domains" processing circuitry can separate the voltage transitions into domains. More specifically, processing circuitry 114 in executing instructions 118 can separate the observed voltage transitions (e.g., raw voltages 122, or the like) into domains, such as, a rising edge domain (e.g., rising edge transition 204, or the like), a falling edge domain (e.g., falling edge transition 206, or the like) and a steady state domain (e.g., steady state transition 208 and steady state transition 210).

Continuing to block 408 "generate domain bitmaps" processing circuitry can generate bitmaps for each of the domains. More specifically, processing circuitry 114 in executing instructions 118 can generate bitmaps for each of the domains, such as, the rising edge domain, the falling edge domain, and the steady state domain. As noted, an example of this is given below.

Continuing to block 410 "compare the generated domain bitmaps to domain bitmaps in a fingerprint" processing circuitry can compare the generated domain bitmaps to domain bitmaps in a fingerprint. For example, processing circuitry 114 of ECU identification device 108 can compare the generated domain bitmaps to domain bitmaps in a fingerprint. Particularly, processing circuitry 114 in executing instructions 118 can compare observed domain bitmap 120 (e.g., domain bitmaps generated at block 408) to domain bitmaps 126 in fingerprint 700. As a specific example, processing circuitry 114 in executing instructions 118 can look up (e.g., compare, match, classify with a machine learning model, or the like) domain bitmaps with domain bitmaps 126 from fingerprint 700.

Continuing to decision block 412 "domain bitmap found in fingerprint?" processing circuitry can determine whether the domain bitmaps are found in the fingerprint. For example, processing circuitry 114 can determine whether the domain bitmaps are found in the fingerprint. Particularly, processing circuitry 114 in executing instructions 118 can determine whether the domain bitmaps generated at block 408 are found in fingerprint 700 (e.g., based on comparing the domain bitmaps at block 410, or the like). From decision block 412, logic flow 400 can continue to either block 414 or block 418. In particular, logic flow 400 can continue from decision block 412 to block 414 based on a determination at decision block 412 that the domain bitmaps are found in the fingerprint while logic flow 400 can continue from decision block 412 to block 418 based on a determination at decision block 412 that the domain bitmaps are not found in the fingerprint.

At block 414 "identify ECU from ECU ID associated with the domain bitmap in the fingerprint" processing circuitry can identify the ECU transmitting the message read at block 402 based on the EDU ID associated with the domain bitmap in the fingerprint. For example, processing circuitry 114 of ECU identification device 108 can identify the ECU that transmitted the message read at block 402 based on the ECU ID associated with the domain bitmap in the fingerprint that matches the observed domain bitmap. Particularly, processing circuitry 114 in executing instructions 118 can identify the ECU (e.g., ECU 102, ECU 104, ECU 106, etc.) that transmitted the message (e.g., message 128, message 130, message 132, message 134, etc.) read at block 402 from the ECU ID 124 associated with the domain bitmap 126 in the fingerprint 700 that matches the domain bitmap generated at block 408 (e.g., observed domain bitmap 120, or the like).

Continuing to decision block 416 "ECU ID match message?" processing circuitry can identify whether the fingerprinted ECU matches the ECU identified by the message. Said differently, processing circuitry can verify the correctness of the ECU identifier in the message based on the ECU ID 124 corresponding from the fingerprint. For example, processing circuitry 114 of ECU identification device 108 can determine whether the ECU ID 124 identified in the fingerprint 700 for the message matches the ECU ID with which the message itself indicates sent the message. From decision block 416, logic flow 400 can continue to either block 418 or can end. In particular, logic flow 400 can continue from decision block 416 to block 418 based on a determination at decision block 416 that the ECU ID from the fingerprint does not match the ECU ID from the message while logic flow 400 can end based on a determination at decision block 416 that the ECU ID from the fingerprint does match the ECU ID from the message.

At block 418 "flag unidentified or masquerading ECU" processing circuitry can flag an unidentified ECU or a known ECU masquerading as another ECU. For example, processing circuitry 114 of ECU identification device 108 can flag (e.g., send a notification to a user, send a notification to a cloud monitoring service, send a notification to a management ECU, or the like) an unidentified ECU or a known ECU masquerading as another ECU. Particularly, processing circuitry 114 in executing instructions 118 can flag the potential unknown or masquerading ECU.

Figure 5A:
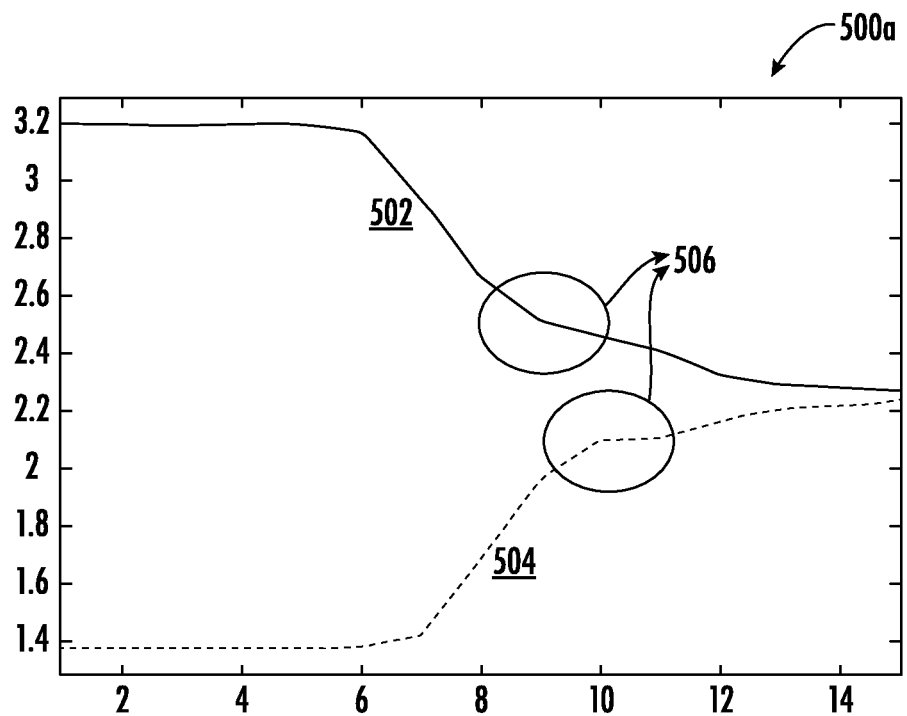
FIG. 5A illustrates a plot 500a in accordance with one embodiment.

As indicated, domain bitmaps are generated based on voltage transitions. In general, these domain bitmaps represent a relationship (often non-linear) for an ECU driving voltage transitions on a pair of conductors (e.g., conductor 138 and conductor 140), such as, for example, would be encountered in a CAN bus with CANH and CANL. Using the CAN bus example, CANH and CANL will be highly correlated as the voltage on each conductor originates from the same ECU, is driven by the same driver, and will have correlated rise and fall times. Furthermore, there is a unique transistor response on the rising edge, falling edges, and steady state for CANH and CANL. FIG. 5A illustrates a plot 500a showing voltage transitions for CANH and CANL associated with an example ECU. For example, this figure depicts a CANH falling edge transition 502 as well as a CANL rising edge transition 504. As can be seen from callouts 506 highlighted in this figure, there is a variance in the voltage characteristics of the edges. Said differently, the edge characteristics are not identical.

Figure 5B:
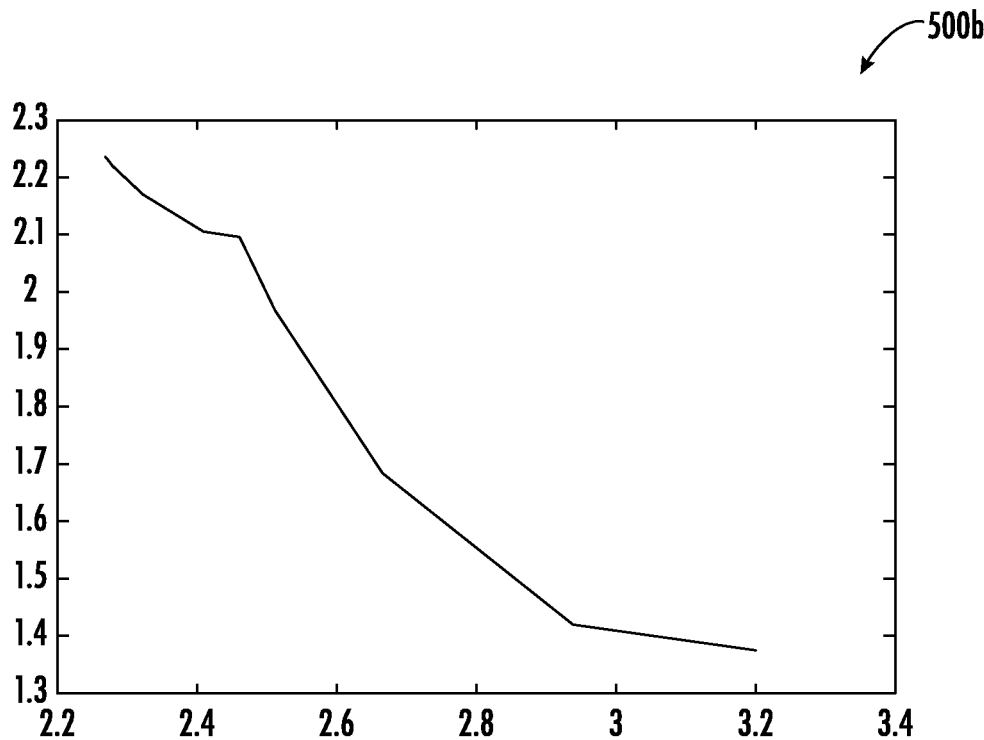
FIG. 5B illustrates a scatter plot 500b in accordance with one embodiment.

FIG. 5B shows a scatter plot 500b depicting the relationship between CANH and CANL example edge (rising/falling) response shown in the plot 500a of FIG. 5A, which exemplifies the deviations from linearity between the edge characteristics for CANH and CANL.

Figure 5C:
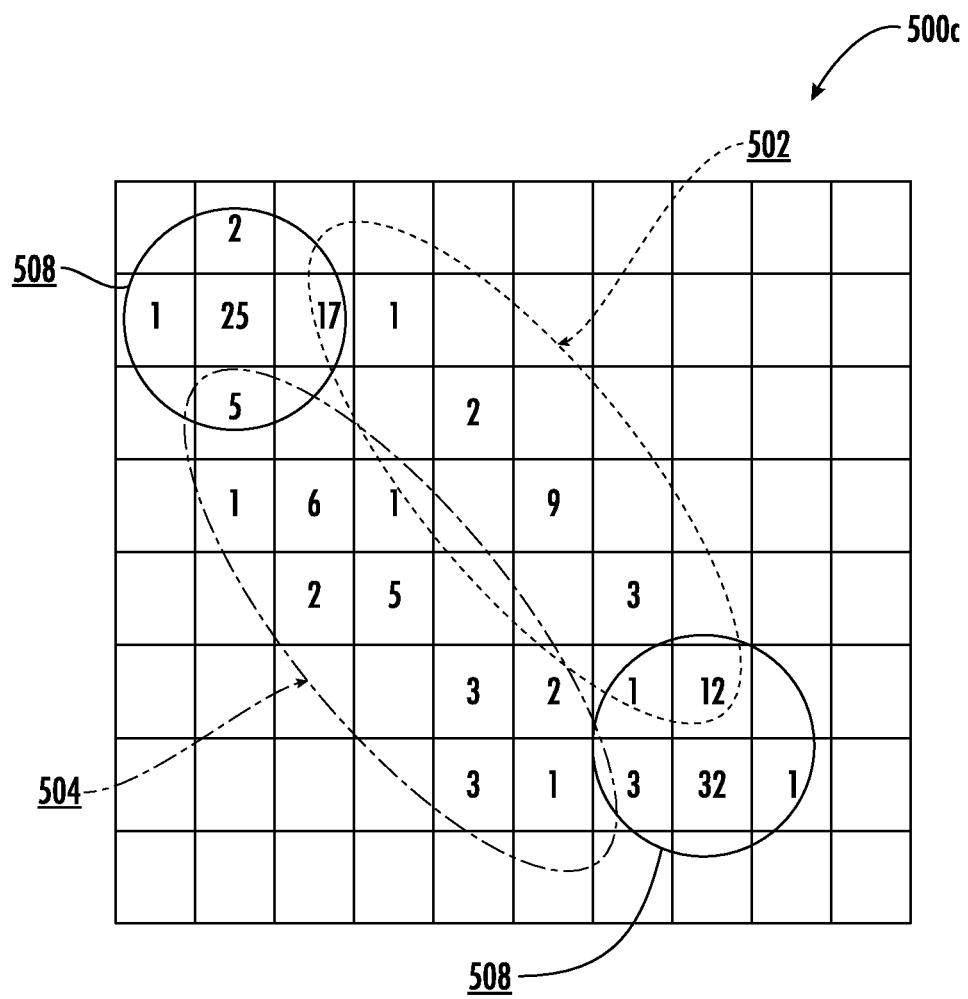
FIG. 5C illustrates a bitmap 500c in accordance with one embodiment.

FIG. 5C illustrates a bitmap 500c, which can be generated from a scatter plot of the voltage transitions. More particularly bitmap 500c illustrates falling edge transition 502, rising edge transition 504 and steady state response 508 (or dominant response). With some examples, the bitmap can be generated based on the following equation: Bitmap[x,y]=$\Sigma V_{Bucket}$, where x=($V_{CANH}$*no_of_buckets)/5 and where y=($V_{CANL}$*no_of_buckets)/5. Said differently, bitmaps can be created by converting the scatter plot to a matrix divided into voltage "buckets" where the value in each bucket is the sum of the relative signal voltage (scatter plot voltage) variations within the range of the given bucket. It is to be appreciated that bitmaps created according to the present disclosure bring out the uniqueness of the correlation of CANH and CANL for each ECU and thus can be used as a fingerprint.

Figure 6:
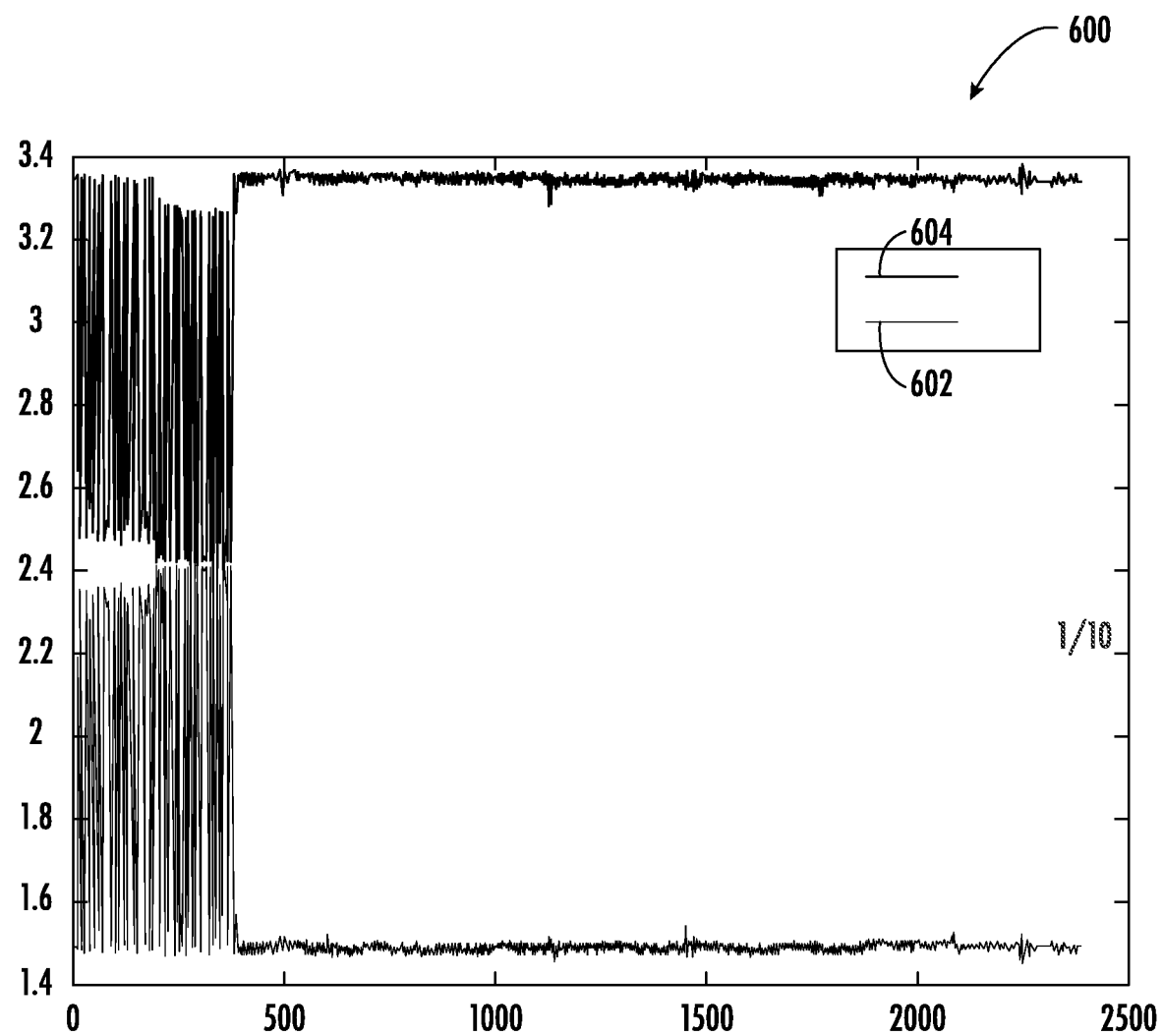
FIG. 6 illustrates a plot 600 in accordance with one embodiment.

FIG. 6 illustrates examples of raw observed voltage transitions. In particular, FIG. 6 illustrates a plot 600 showing raw analog voltage signals observed on a pair of conductors, such as, CANH and CANL of a CAN bus. For example, plot 600 illustrates observed voltage 602 and observed voltage 604. Furthermore, the voltages depicted in this figure are shown after domain separation plotted on the same graph. Specifically, the rising edge, followed by the falling edge, followed by the steady (dominant) state are depicted. As described above, voltage signals can be observed at a pair of conductors on a communication bus (e.g., a CAN bus). As such, in this example, observed voltage 602 can be voltage observed on the CANH conductor while observed voltage 604 can be voltage observed on the CANL conductor. Furthermore, observed voltage 602 and observed voltage 604 are observed at a single point on the bus, such as, point 136, and stored as raw voltages 122.

From the observed voltages (e.g., from observed voltage 602 and observed voltage 604) domain bitmaps can be generated. For example, processing circuitry 114 can execute instructions 118 to separate raw voltages 122 into domains, such as, rising edge, falling edge, and steady state. From the separated domains, a bitmap representing the raw voltages 122 can be generated as described above. With some examples, a bitmap can be generated for each domain. In other examples, a bitmap for a combination of domains or all domains can be generated. For example, bitmaps for rising and falling domains, rising and steady state domains, falling and steady state domains, or rising, falling, and steady state domains can be generated.

Figure 7:
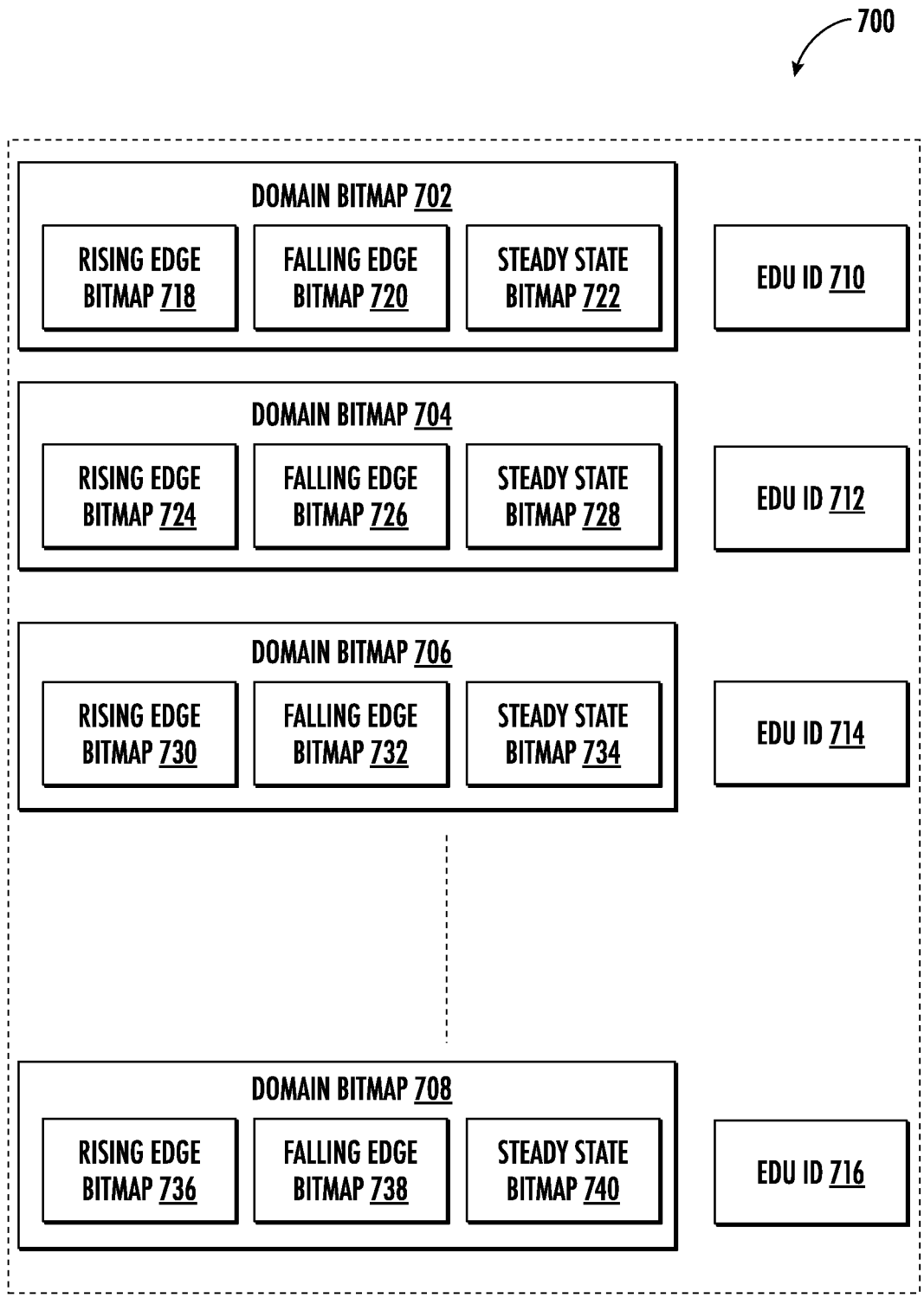
FIG. 7 illustrates a fingerprint 700 in accordance with one embodiment.

FIG. 7 illustrates an example fingerprint 700 including profiles for multiple ECUs. Fingerprint 700 can be an example of a fingerprint from system 100a of FIG. 1A. In general, fingerprint 700 includes an entry for each ECU in the system, where each entry includes an ECU ID and an associated domain bitmap. In particular, this figure illustrates ECU ID 710, EDU ID 712, EDU ID 714, and EDU ID 716 with associated domain bitmaps. Specifically, ECU ID 710 is associated with domain bitmap 702, EDU ID 712 is associated with domain bitmap 704, EDU ID 714 is associated with domain bitmap 706, and EDU ID 716 is associated with domain bitmap 708.

In general, the domain bitmaps can include indications of a bitmap for multiple domains. For example, this figure illustrates rising edge bitmaps, falling edge bitmaps, and steady state bitmaps. Particularly, domain bitmap 702 includes rising edge bitmap 718, falling edge bitmap 720, and 722; domain bitmap 704 includes rising edge bitmap 724, falling edge bitmap 726, and steady state bitmap 728; domain bitmap 706 includes rising edge bitmap 730, falling edge bitmap 732, and steady state bitmap 734; while domain bitmap 708 includes rising edge bitmap 736, falling edge bitmap 738, and steady state bitmap 740. Fingerprint 700 can be implemented in a database, in a table, or in another information element or data structure.

Figure 8:
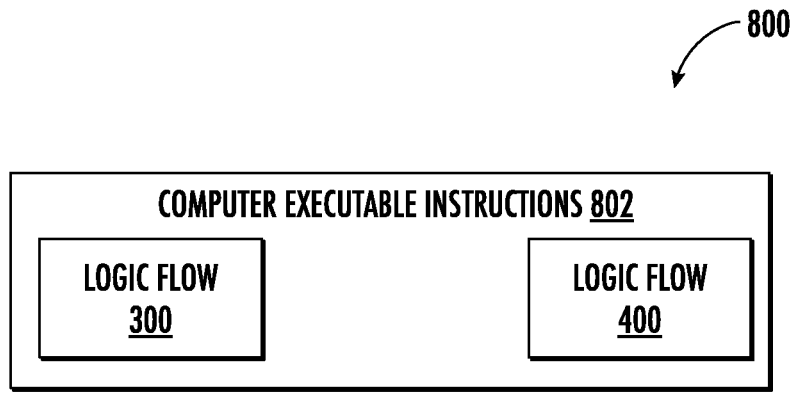
FIG. 8 illustrates a storage device 800 in accordance with one embodiment.

FIG. 8 illustrates an example of a storage device 800. Storage device 800 may comprise an article of manufacture, such as, any non-transitory computer readable medium or machine readable medium, such as an optical, magnetic or semiconductor storage. Storage device 800 may store various types of computer executable instructions 802, such as instructions to implement logic flow 300 or logic flow 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
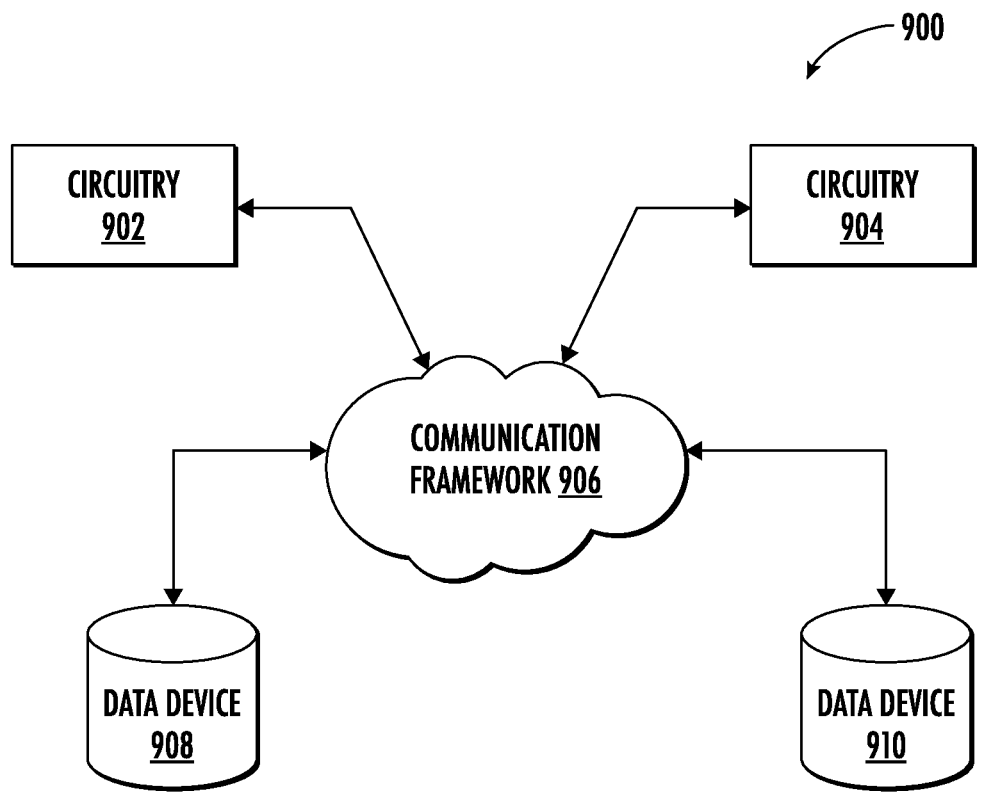
FIG. 9 illustrates an in-vehicle communication architecture 900 in accordance with one embodiment.

FIG. 9 illustrates an in-vehicle communication architecture 900 according to one or more embodiments of the disclosure. For example, one or more vehicular devices, components, or circuits, such as circuitry 902 and/or circuitry 904, may communicate with each other via a communications communication framework 906, which may be an in-vehicle network, such as a CAN bus, implemented to facilitate fingerprinting of ECUs as described above.

The in-vehicle communication architecture 900 includes various common communications elements, such as a transmitter, receiver, transceiver, and so forth. The embodiments, however, are not limited to implementation by the in-vehicle communication architecture 900. As shown in this figure, the vehicular circuitry 902 and circuitry 904 may each be operatively connected to one or more respective data devices, such as, data device 908 and/or data device 910 that can be employed to store information local to the respective circuitry 902 and/or circuitry 904, such as fingerprints, domain bitmaps, or the like. It may be understood that the circuitry 902 and circuitry 904 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 906 in a vehicle.

Further, the communication framework 906 may implement any well-known communications techniques and protocols. As described above, the communication framework 906 may be implemented as a CAN bus protocol or any other suitable in-vehicle communication protocol. The communication framework 906 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 906 may employ both wired and wireless connections.

Figure 10:
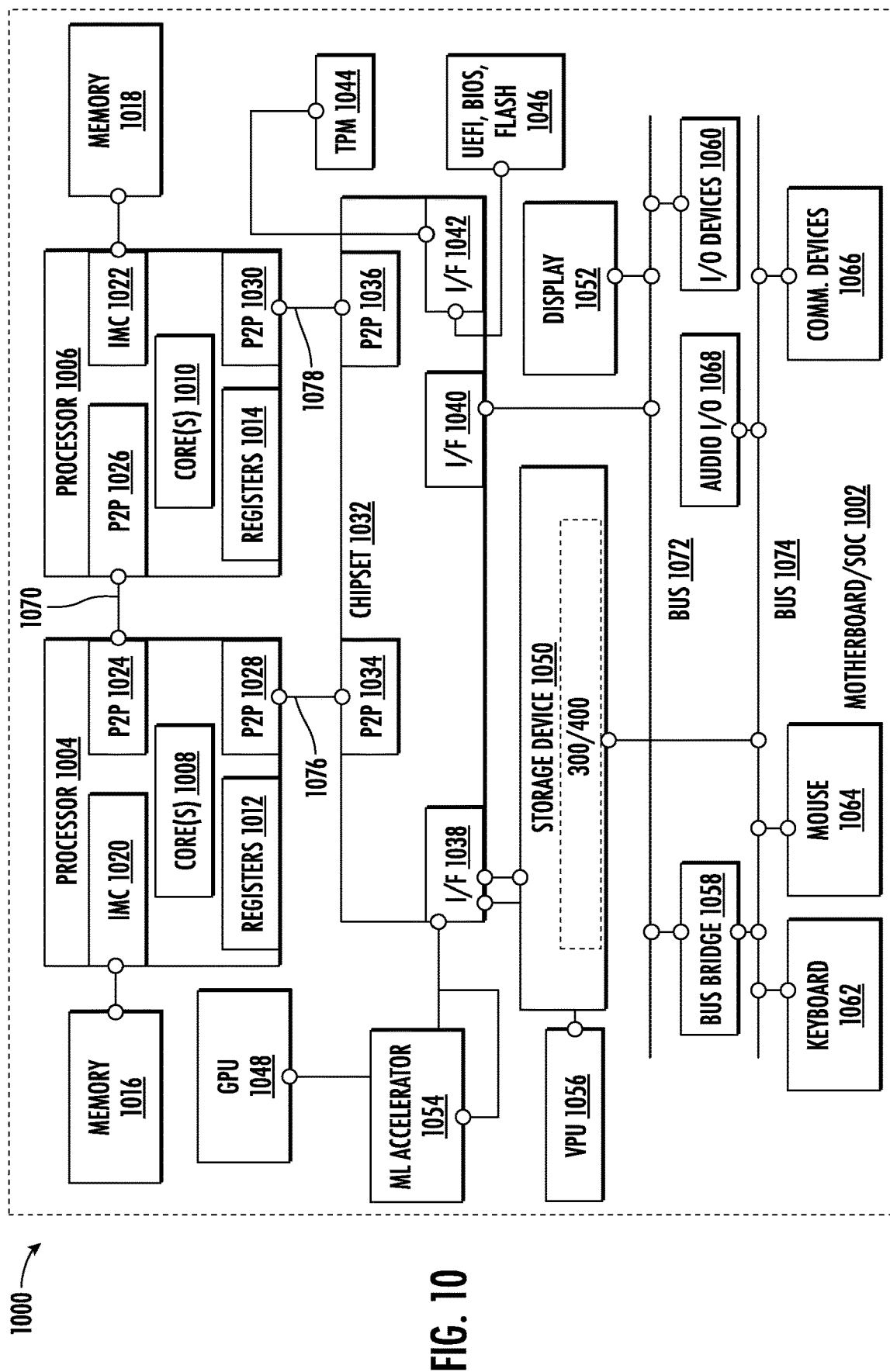
FIG. 10 illustrates an aspect of the subject matter in accordance with one embodiment.

FIG. 10 illustrates an embodiment of a system 1000. System 1000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 1000 may have a single processor with one core or more than one processor. Note that the term "processor" refers to a processor with a single core or a processor package with multiple processor cores. In at least one embodiment, the computing system 1000 is representative of the components of system 100*a*, system 100*b*, or the like. More generally, the computing system 1000 is configured to implement all logic, systems, logic flows, methods, apparatuses, and functionality described herein with reference to FIG. 1A, FIG. 1B, FIG. 2, FIG. 3, FIG. 4, FIG. 5A, FIG. 5B, FIG. 5C, FIG. 6, FIG. 7, FIG. 8, and FIG. 9.

As used in this application, the terms "system" and "component" and "module" are intended to refer to a computer-related entity, either hardware, a combination of hardware and software, software, or software in execution, examples of which are provided by the exemplary system 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 1000 comprises a motherboard or system-on-chip (SoC) 1002 for mounting platform components. Motherboard or system-on-chip (SoC) 1002 is a point-to-point (P2P) interconnect platform that includes a first processor 1004 and a second processor 1006 coupled via a point-to-point interconnect 1070 such as an Ultra Path Interconnect (UPI). In other embodiments, the system 1000 may be of another bus architecture, such as a multi-drop bus. Furthermore, each of processor 1004 and processor 1006 may be processor packages with multiple processor cores including core(s) 1008 and core(s) 1010, respectively. While the system 1000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 1004 and chipset 1032. Some platforms may include additional components and some platforms may only include sockets to mount the processors and/or the chipset. Furthermore, some platforms may not have sockets (e.g. SoC, or the like).

The processor 1004 and processor 1006 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 1004 and/or processor 1006. Additionally, the processor 1004 need not be identical to processor 1006.

Processor 1004 includes an integrated memory controller (IMC) 1020 and point-to-point (P2P) interface 1024 and P2P interface 1028. Similarly, the processor 1006 includes an IMC 1022 as well as P2P interface 1026 and P2P interface 1030. IMC 1020 and IMC 1022 couple the processors processor 1004 and processor 1006, respectively, to respective memories (e.g., memory 1016 and memory 1018). Memory 1016 and memory 1018 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 1016 and memory 1018 locally attach to the respective processors (i.e., processor 1004 and processor 1006). In other embodiments, the main memory may couple with the processors via a bus and shared memory hub.

System 1000 includes chipset 1032 coupled to processor 1004 and processor 1006. Furthermore, chipset 1032 can be coupled to storage device 1050, for example, via an interface (I/F) 1038. The I/F 1038 may be, for example, a Peripheral Component Interconnect-enhanced (PCI-e). Storage device 1050 can store instructions executable by circuitry of system 1000 (e.g., processor 1004, processor 1006, GPU 1048, ML accelerator 1054, vision processing unit 1056, or the like).

For example, storage device 1050 can store instructions for logic flow 300, logic flow 400, or the like.

Processor 1004 couples to a chipset 1032 via P2P interface 1028 and P2P 1034 while processor 1006 couples to a chipset 1032 via P2P interface 1030 and P2P 1036. Direct media interface (DMI) 1076 and DMI 1078 may couple the P2P interface 1028 and the P2P 1034 and the P2P interface 1030 and P2P 1036, respectively. DMI 1076 and DMI 1078 may be a high-speed interconnect that facilitates, e.g., eight Giga Transfers per second (GT/s) such as DMI 3.0. In other embodiments, the processor 1004 and processor 1006 may interconnect via a bus.

The chipset 1032 may comprise a controller hub such as a platform controller hub (PCH). The chipset 1032 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 1032 may comprise more than one controller hub such as a chipset with a memory controller hub, a graphics controller hub, and an input/output (I/O) controller hub.

In the depicted example, chipset 1032 couples with a trusted platform module (TPM) 1044 and UEFI, BIOS, FLASH circuitry 1046 via I/F 1042. The TPM 1044 is a dedicated microcontroller designed to secure hardware by integrating cryptographic keys into devices. The UEFI, BIOS, FLASH circuitry 1046 may provide pre-boot code.

Furthermore, chipset 1032 includes the I/F 1038 to couple chipset 1032 with a high-performance graphics engine, such as, graphics processing circuitry or a graphics processing unit (GPU) 1048. In other embodiments, the system 1000 may include a flexible display interface (FDI) (not shown) between the processor 1004 and/or the processor 1006 and the chipset 1032. The FDI interconnects a graphics processor core in one or more of processor 1004 and/or processor 1006 with the chipset 1032.

Additionally, ML accelerator 1054 and/or vision processing unit 1056 can be coupled to chipset 1032 via I/F 1038. ML accelerator 1054 can be circuitry arranged to execute ML related operations (e.g., training, inference, etc.) for ML models. Likewise, vision processing unit 1056 can be circuitry arranged to execute vision processing specific or related operations. In particular, ML accelerator 1054 and/or vision processing unit 1056 can be arranged to execute mathematical operations and/or operands useful for machine learning, neural network processing, artificial intelligence, vision processing, etc.

Various I/O devices 1060 and display 1052 couple to the bus 1072, along with a bus bridge 1058 which couples the bus 1072 to a second bus 1074 and an I/F 1040 that connects the bus 1072 with the chipset 1032. In one embodiment, the second bus 1074 may be a low pin count (LPC) bus. Various devices may couple to the second bus 1074 including, for example, a keyboard 1062, a mouse 1064 and communication devices 1066.

Furthermore, an audio I/O 1068 may couple to second bus 1074. Many of the I/O devices 1060 and communication devices 1066 may reside on the motherboard or system-on-chip (SoC) 1002 while the keyboard 1062 and the mouse 1064 may be add-on peripherals. In other embodiments, some or all the I/O devices 1060 and communication devices 1066 are add-on peripherals and do not reside on the motherboard or system-on-chip (SoC) 1002.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1

An apparatus, comprising: processing circuitry; and memory coupled to the processing circuitry, the memory comprising instructions that when executed by the processing circuitry cause the processing circuitry to: process a voltage waveform to generate an observed domain bitmap from the voltage waveform, determine whether the observed domain bitmap matches a fingerprint domain bitmap from a fingerprint, and identify an electronic control unit (ECU) associated with the fingerprint domain bitmap based on a determination that the observed domain bitmap matched the fingerprint domain bitmap.

Example 2

The apparatus of example 1, the instructions when executed by the processing circuitry cause the processing circuitry to: compare the observed domain bitmap to a plurality of fingerprint domain bitmaps from the fingerprint, the plurality of fingerprint domain bitmaps comprising the fingerprint domain bitmap; and determine whether the observed domain bitmap matched the fingerprint domain bitmap based on comparing the observed domain bitmap to the plurality of fingerprint domain bitmaps.

Example 3

The apparatus of example 1 or 2, the observed domain bitmap comprising one or more of a rising edge domain bitmap, a falling edge domain bitmap, a steady state domain bitmap, or a combination rising, falling, and steady state bitmap.

Example 4

The apparatus of example 1, 2, or 3, the instructions when executed by the processing circuitry cause the processing circuitry to: identify a message transmitted on a communication bus; observe voltage transitions on the communication bus associated with transmission of the message; and generate the voltage waveform based on the observed voltage transitions.

Example 5

The apparatus of example 1, 2, 3, or 4, comprising observation circuitry arranged to observe the voltage transitions at a point on the communication bus.

Example 6

The apparatus of example 1, 2, 3, 4, or 5, the instructions when executed by the processing circuitry cause the processing circuitry to: look up an ECU identification (ID) associated with the fingerprint domain bitmap; and identify the ECU based on the ECU ID.

Example 7

The apparatus of example 1, 2, 3, 4, or 5, the memory comprising the fingerprint, the fingerprint comprising a plurality of fingerprint domain bitmaps and a plurality of ECU IDs associated with the plurality of fingerprint domain bitmaps.

Example 8

The apparatus of example 1, 2, 3, 4, 5, 6, or 7, the instructions when executed by the processing circuitry cause the processing circuitry to flag an unidentified ECU based on a determination that the observed domain bitmap does not match the fingerprint domain bitmap.

Example 9

The apparatus of example 1, 2, 3, 4, 5, 6, 7, or 8, wherein the communication bus is an in-vehicle network.

Example 10

A system, comprising: at least one electronic control unit (ECU); and an ECU identification sub-system coupled to the at least one ECU via a network, the ECU identification sub-system comprising: processing circuitry; memory coupled to the processing circuitry, the memory comprising instructions that when executed by the processing circuitry cause the processing circuitry to: process a voltage waveform observed on the network to generate an observed domain bitmap from the voltage waveform, determine whether the observed domain bitmap matches a fingerprint domain bitmap from a fingerprint, and identify an electronic control unit (ECU) associated with the fingerprint domain bitmap based on a determination that the observed domain bitmap matched the fingerprint domain bitmap.

Example 11

The system of example 10, the instructions when executed by the processing circuitry cause the processing circuitry to: compare the observed domain bitmap to a plurality of fingerprint domain bitmaps from the fingerprint, the plurality of fingerprint domain bitmaps comprising the fingerprint domain bitmap; and determine whether the observed domain bitmap matched the fingerprint domain bitmap based on comparing the observed domain bitmap to the plurality of fingerprint domain bitmaps.

Example 12

The system of example 10 or 11, the observed domain bitmap comprising one or more of a rising edge domain bitmap, a falling edge domain bitmap, a steady state domain bitmap, and a combination rising, falling, and steady state bitmap.

Example 13

The system of example 10, 11, or 12, the instructions when executed by the processing circuitry cause the processing circuitry to: identify a message transmitted on a communication bus; observe voltage transitions on the communication bus associated with transmission of the message; and generate the voltage waveform based on the observed voltage transitions.

Example 14

The system of example 10, 11, 12, or 13, the ECU identification sub-system comprising observation circuitry arranged to observe the voltage transitions at a point on the communication bus.

Example 15

The system of example 10, 11, 12, 13, or 14, the instructions when executed by the processing circuitry cause the processing circuitry to: look up an ECU identification (ID) associated with the fingerprint domain bitmap; and identify the ECU based on the ECU ID.

Example 16

The system of example 10, 11, 12, 13, 14, or 15, the memory comprising the fingerprint, the fingerprint comprising a plurality of fingerprint domain bitmaps and a plurality of ECU IDs associated with the plurality of fingerprint domain bitmaps.

Example 17

The system of example 10, 11, 12, 13, 14, 15, or 16, the instructions when executed by the processing circuitry cause the processing circuitry to flag an unidentified ECU based on a determination that the observed domain bitmap does not match the fingerprint domain bitmap or that a known ECU is sending messages as another ECU.

Example 18

The system of example 10, 11, 12, 13, 14, 15, 16, or 17, wherein the network is an in-vehicle network.

Example 19

At least one non-transitory computer-readable storage device comprising instructions that when executed by processing circuitry cause the processing circuitry to: process a voltage waveform observed on a network to generate an observed domain bitmap from the voltage waveform; determine whether the observed domain bitmap matches a fingerprint domain bitmap from a fingerprint; and identify an electronic control unit (ECU) associated with the fingerprint domain bitmap based on a determination that the observed domain bitmap matched the fingerprint domain bitmap.

Example 20

The non-transitory computer-readable storage device of example 19, comprising instructions that when executed by the processing circuitry cause the processing circuitry to: compare the observed domain bitmap to a plurality of fingerprint domain bitmaps from the fingerprint, the plurality of fingerprint domain bitmaps comprising the fingerprint domain bitmap; and determine whether the observed domain bitmap matched the fingerprint domain bitmap based on comparing the observed domain bitmap to the plurality of fingerprint domain bitmaps.

Example 21

The non-transitory computer-readable storage device of example 19 or 20, the observed domain bitmap comprising one or more of a rising edge domain bitmap, a falling edge domain bitmap, and a steady state domain bitmap.

Example 22

The non-transitory computer-readable storage device of example 19, 20, or 21, comprising instructions that when executed by the processing circuitry cause the processing circuitry to: identify a message transmitted on a communication bus; observe voltage transitions on the communication bus associated with transmission of the message; and generate the voltage waveform based on the observed voltage transitions.

Example 23

The non-transitory computer-readable storage device of example 19, 20, 21, or 22, comprising instructions that when executed by the processing circuitry cause the processing circuitry to: look up an ECU identification (ID) associated with the fingerprint domain bitmap; and identify the ECU based on the ECU ID.

Example 24

The non-transitory computer-readable storage device of example 19, 20, 21, or 22, the fingerprint comprising a plurality of fingerprint domain bitmaps and a plurality of ECU IDs associated with the plurality of fingerprint domain bitmaps.

Example 25

The non-transitory computer-readable storage device of example 19, 20, 21, 22, 23, or 24, comprising instructions that when executed by the processing circuitry cause the processing circuitry to flag an unidentified ECU based on a determination that the observed domain bitmap does not match the fingerprint domain bitmap.

Example 26

The non-transitory computer-readable storage device of example 19, 20, 21, 22, 23, 24, or 25, wherein the network bus is an in-vehicle network.

Example 27

A method, comprising: processing a voltage waveform observed on a network to generate an observed domain bitmap from the voltage waveform; determining whether the observed domain bitmap matches a fingerprint domain bitmap from a fingerprint; and identifying an electronic control unit (ECU) associated with the fingerprint domain bitmap based on a determination that the observed domain bitmap matched the fingerprint domain bitmap.

Example 28

The method of example 27, comprising: comparing the observed domain bitmap to a plurality of fingerprint domain bitmaps from the fingerprint, the plurality of fingerprint domain bitmaps comprising the fingerprint domain bitmap; and determining whether the observed domain bitmap matched the fingerprint domain bitmap based on comparing the observed domain bitmap to the plurality of fingerprint domain bitmaps.

Example 29

The method of example 27 or 28, the observed domain bitmap comprising one or more of a rising edge domain bitmap, a falling edge domain bitmap, and a steady state domain bitmap.

Example 30

The method of example 27, 28, or 29, comprising: identifying a message transmitted on a communication bus; observing voltage transitions on the communication bus associated with transmission of the message; and generating the voltage waveform based on the observed voltage transitions.

Example 31

The method of example 27, 28, 29, or 30, comprising: looking up an ECU identification (ID) associated with the fingerprint domain bitmap; and identifying the ECU based on the ECU ID.

Example 32

The method of example 27, 28, 29, or 30, the fingerprint comprising a plurality of fingerprint domain bitmaps and a plurality of ECU IDs associated with the plurality of fingerprint domain bitmaps.

Example 33

The method of example 27, 28, 29, 30, 31, or 32, comprising flagging an unidentified ECU based on a determination that the observed domain bitmap does not match the fingerprint domain bitmap.

Example 34

The method of example 27, 28, 29, 30, 31, 32, or 33, wherein the communication bus is an in-vehicle network.

Example 35

An apparatus, comprising: means for processing a voltage waveform observed on a network to generate an observed domain bitmap from the voltage waveform; means for determining whether the observed domain bitmap matches a fingerprint domain bitmap from a fingerprint; and means for identifying an electronic control unit (ECU) associated with the fingerprint domain bitmap based on a determination that the observed domain bitmap matched the fingerprint domain bitmap.

Example 36

The apparatus of example 35, comprising: means for comparing the observed domain bitmap to a plurality of fingerprint domain bitmaps from the fingerprint, the plurality of fingerprint domain bitmaps comprising the fingerprint domain bitmap; and means for determining whether the observed domain bitmap matched the fingerprint domain bitmap based on comparing the observed domain bitmap to the plurality of fingerprint domain bitmaps.

Example 37

The apparatus of example 35 or 36, the observed domain bitmap comprising one or more of a rising edge domain bitmap, a falling edge domain bitmap, and a steady state domain bitmap.

Example 38

The apparatus of example 35, 36, or 37, comprising: means for identifying a message transmitted on a communication bus; means for observing voltage transitions on the communication bus associated with transmission of the message; and means for generating the voltage waveform based on the observed voltage transitions.

Example 39

The apparatus of example 35, 36, 37, or 38, comprising: means for looking up an ECU identification (ID) associated with the fingerprint domain bitmap; and means for identifying the ECU based on the ECU ID.

Example 40

The apparatus of example 35, 36, 37, or 38, the fingerprint comprising a plurality of fingerprint domain bitmaps and a plurality of ECU IDs associated with the plurality of fingerprint domain bitmaps.

Example 41

The apparatus of example 35, 36, 37, 38, 39, or 40, comprising means for flagging an unidentified ECU based on a determination that the observed domain bitmap does not match the fingerprint domain bitmap.

Example 42

The apparatus of example 35, 36, 37, 38, 39, 40, or 41, wherein the communication bus is an in-vehicle network.

What is claimed is:

1. An apparatus, comprising:
   processing circuitry for an identification device; and
   memory coupled to the processing circuitry, the memory comprising instructions that when executed by the processing circuitry cause the processing circuitry to:
   process a voltage waveform associated with a message to generate an observed domain bitmap from the voltage waveform;
   determine whether the observed domain bitmap matches a fingerprint domain bitmap from a fingerprint;
   identify an electronic control unit (ECU) from an ECU identifier (ID) associated with the fingerprint domain bitmap based on a determination that the observed domain bitmap matched the fingerprint domain bitmap; and
   determine the ECU is a source of the message when an ECU ID from the message matches the ECU ID associated with the fingerprint domain bitmap.

2. The apparatus of claim 1, the instructions when executed by the processing circuitry cause the processing circuitry to:
   compare the observed domain bitmap to a plurality of fingerprint domain bitmaps from the fingerprint, the plurality of fingerprint domain bitmaps comprising the fingerprint domain bitmap; and
   determine whether the observed domain bitmap matched the fingerprint domain bitmap based on comparing the observed domain bitmap to the plurality of fingerprint domain bitmaps.

3. The apparatus of claim 1, the observed domain bitmap comprising one or more of a rising edge domain bitmap, a falling edge domain bitmap, a steady state domain bitmap, or a combination rising, falling, and steady state bitmap.

4. The apparatus of claim 1, the instructions when executed by the processing circuitry cause the processing circuitry to:
   identify the message transmitted on a communication bus;
   observe voltage transitions on the communication bus associated with transmission of the message; and
   generate the voltage waveform based on the observed voltage transitions.

5. The apparatus of claim 4, wherein the communication bus is an in-vehicle network.

6. The apparatus of claim 1, comprising observation circuitry arranged to observe the voltage transitions at a point on the communication bus.

7. The apparatus of claim 1, the instructions when executed by the processing circuitry cause the processing circuitry to:
look up the ECU ID associated with the fingerprint domain bitmap; and
identify the ECU based on the ECU ID.

8. The apparatus of claim 1, the memory comprising the fingerprint, the fingerprint comprising a plurality of fingerprint domain bitmaps and a plurality of ECU IDs associated with the plurality of fingerprint domain bitmaps.

9. The apparatus of claim 1, the instructions when executed by the processing circuitry cause the processing circuitry to flag an unidentified ECU based on a determination that the observed domain bitmap does not match the fingerprint domain bitmap.

10. A system, comprising:
at least one electronic control unit (ECU); and
an ECU identification sub-system coupled to the at least one ECU via an in-vehicle network (IVN), the ECU identification sub-system comprising:
processing circuitry; and
memory coupled to the processing circuitry, the memory comprising instructions that when executed by the processing circuitry cause the processing circuitry to:
process a voltage waveform associated with a message to generate an observed domain bitmap from the voltage waveform;
determine whether the observed domain bitmap matches a fingerprint domain bitmap from a fingerprint;
identify an electronic control unit (ECU) from an ECU identifier (ID) associated with the fingerprint domain bitmap based on a determination that the observed domain bitmap matched the fingerprint domain bitmap; and
determine the ECU is a source of the message when an ECU ID from the message matches the ECU ID associated with the fingerprint domain bitmap.

11. The system of claim 10, the instructions when executed by the processing circuitry cause the processing circuitry to:
compare the observed domain bitmap to a plurality of fingerprint domain bitmaps from the fingerprint, the plurality of fingerprint domain bitmaps comprising the fingerprint domain bitmap; and
determine whether the observed domain bitmap matched the fingerprint domain bitmap based on comparing the observed domain bitmap to the plurality of fingerprint domain bitmaps.

12. The system of claim 10, the observed domain bitmap comprising one or more of a rising edge domain bitmap, a falling edge domain bitmap, a steady state domain bitmap, and a combination rising, falling, and steady state bitmap.

13. The system of claim 10, the instructions when executed by the processing circuitry cause the processing circuitry to:
identify the message transmitted on a communication bus;
observe voltage transitions on the communication bus associated with transmission of the message; and
generate the voltage waveform based on the observed voltage transitions.

14. The system of claim 10, the ECU identification sub-system comprising observation circuitry arranged to observe the voltage transitions at a point on the communication bus.

15. The system of claim 10, the instructions when executed by the processing circuitry cause the processing circuitry to:
look up the ECU ID associated with the fingerprint domain bitmap; and
identify the ECU based on the ECU ID.

16. The system of claim 10, the memory comprising the fingerprint, the fingerprint comprising a plurality of fingerprint domain bitmaps and a plurality of ECU IDs associated with the plurality of fingerprint domain bitmaps.

17. The system of claim 10, the instructions when executed by the processing circuitry cause the processing circuitry to flag an unidentified ECU based on a determination that the observed domain bitmap does not match the fingerprint domain bitmap or that a known ECU is sending messages as another ECU.

18. At least one non-transitory computer-readable storage device comprising instructions that when executed by processing circuitry cause the processing circuitry to:
process a voltage waveform associated with a message observed on an in-vehicle network (IVN) to generate an observed domain bitmap from the voltage waveform for an identification device;
determine whether the observed domain bitmap matches a fingerprint domain bitmap from a fingerprint;
identify an electronic control unit (ECU) from an ECU identifier (ID) associated with the fingerprint domain bitmap based on a determination that the observed domain bitmap matched the fingerprint domain bitmap; and
determine the ECU is a source of the message when an ECU ID from the message matches the ECU ID associated with the fingerprint domain bitmap.

19. The non-transitory computer-readable storage device of claim 18, comprising instructions that when executed by the processing circuitry cause the processing circuitry to:
compare the observed domain bitmap to a plurality of fingerprint domain bitmaps from the fingerprint, the plurality of fingerprint domain bitmaps comprising the fingerprint domain bitmap; and
determine whether the observed domain bitmap matched the fingerprint domain bitmap based on comparing the observed domain bitmap to the plurality of fingerprint domain bitmaps.

20. The non-transitory computer-readable storage device of claim 18, the observed domain bitmap comprising one or more of a rising edge domain bitmap, a falling edge domain bitmap, and a steady state domain bitmap.

21. The non-transitory computer-readable storage device of claim 18, comprising instructions that when executed by the processing circuitry cause the processing circuitry to:
identify the message transmitted on a communication bus;
observe voltage transitions on the communication bus associated with transmission of the message; and
generate the voltage waveform based on the observed voltage transitions.

22. The non-transitory computer-readable storage device of claim 21, wherein the communication bus is an in-vehicle network.

23. The non-transitory computer-readable storage device of claim 21, comprising instructions that when executed by the processing circuitry cause the processing circuitry to:
 look up the ECU ID associated with the fingerprint domain bitmap; and
 identify the ECU based on the ECU ID.

24. The non-transitory computer-readable storage device of claim 21, the fingerprint comprising a plurality of fingerprint domain bitmaps and a plurality of ECU IDs associated with the plurality of fingerprint domain bitmaps.

25. The non-transitory computer-readable storage device of claim 21, comprising instructions that when executed by the processing circuitry cause the processing circuitry to flag an unidentified ECU based on a determination that the observed domain bitmap does not match the fingerprint domain bitmap.

\* \* \* \* \*